Nov. 7, 1967 P. A. MILLER ET AL 3,351,038
CONFECTION COATING APPARATUS
Filed Aug. 24, 1965 4 Sheets-Sheet 4
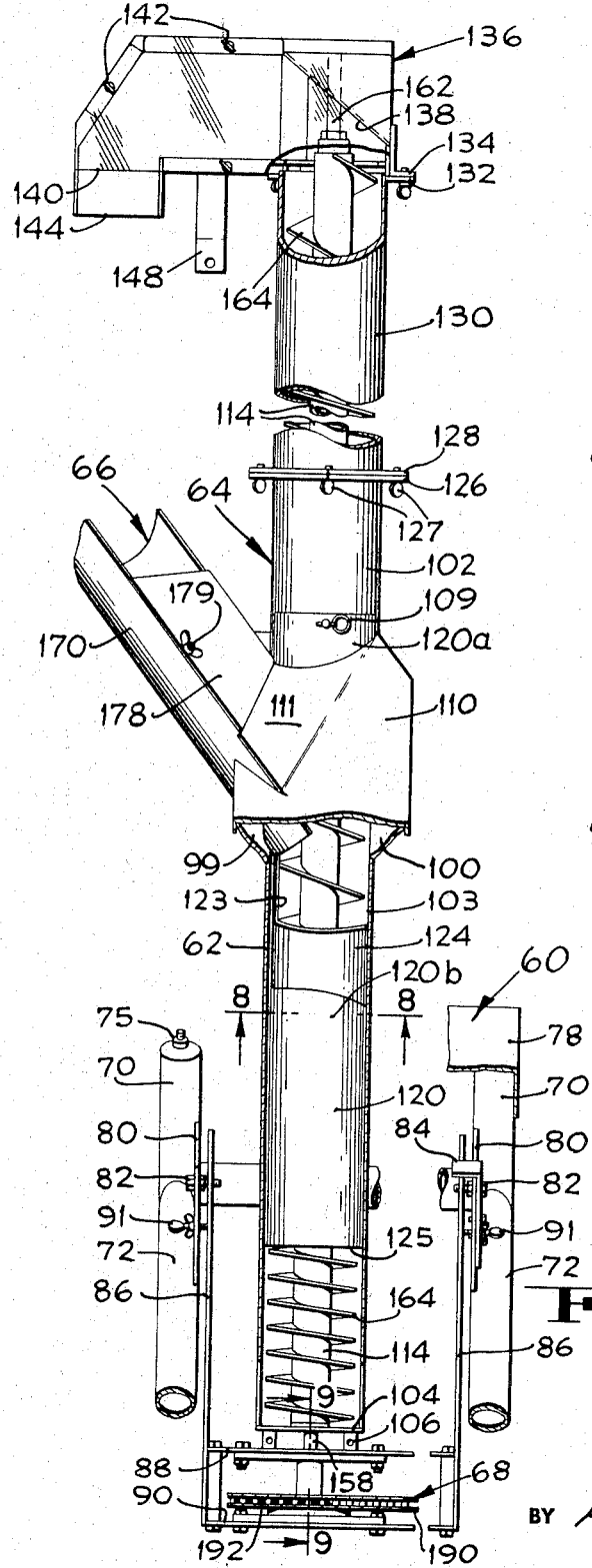
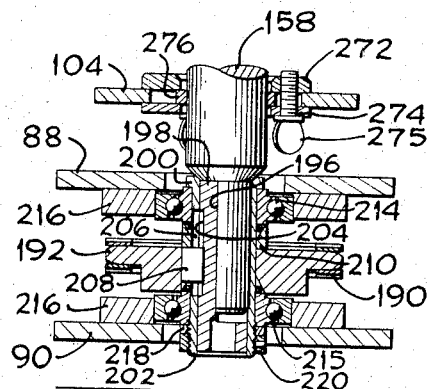
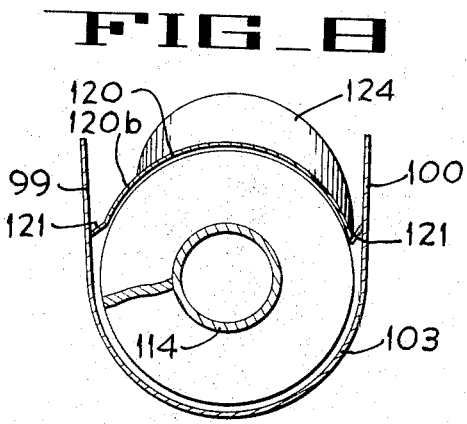
FIG_9
FIG_8
FIG_7
INVENTORS
PHILLIP A. MILLER
ROBERT J. BETSCHART
BY Hans G. Hoffmeister
ATTORNEY

United States Patent Office 3,351,038
Patented Nov. 7, 1967

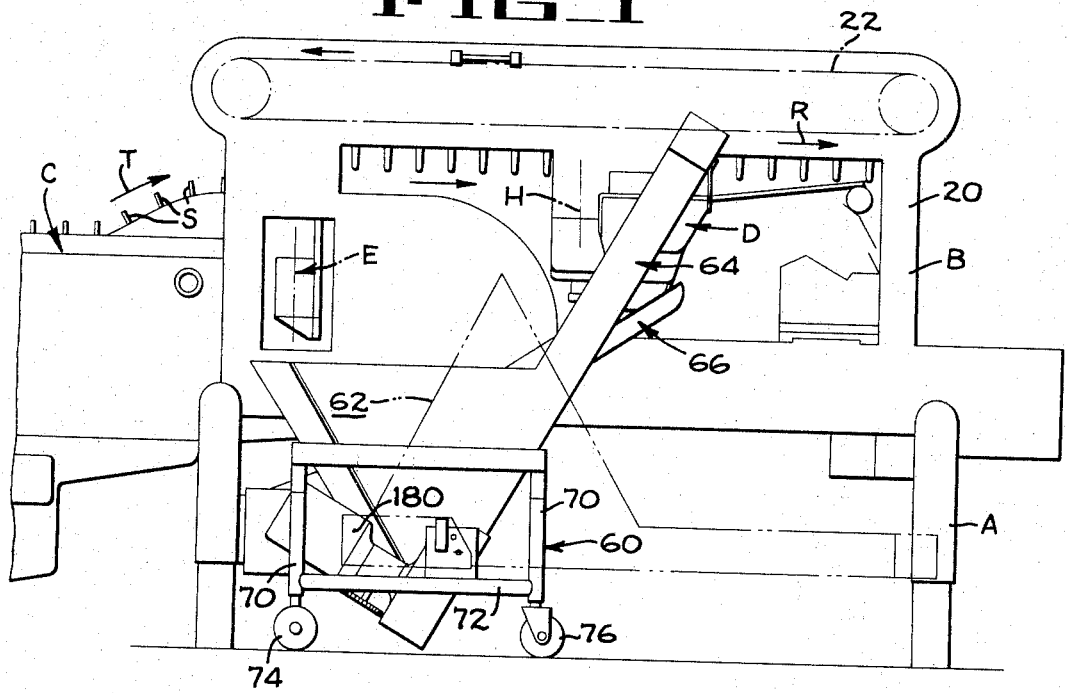
FIG_1
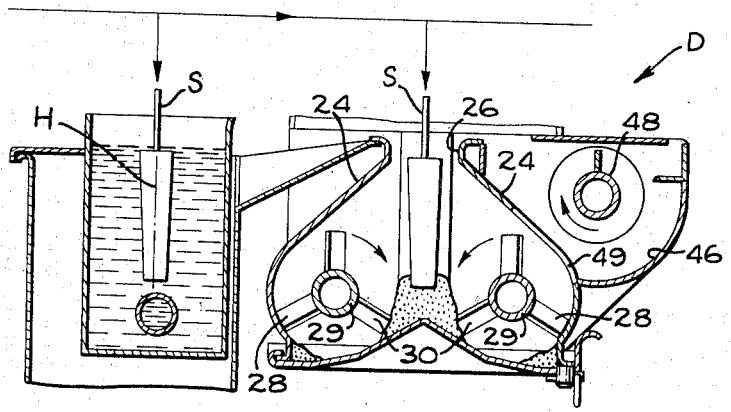
FIG_3

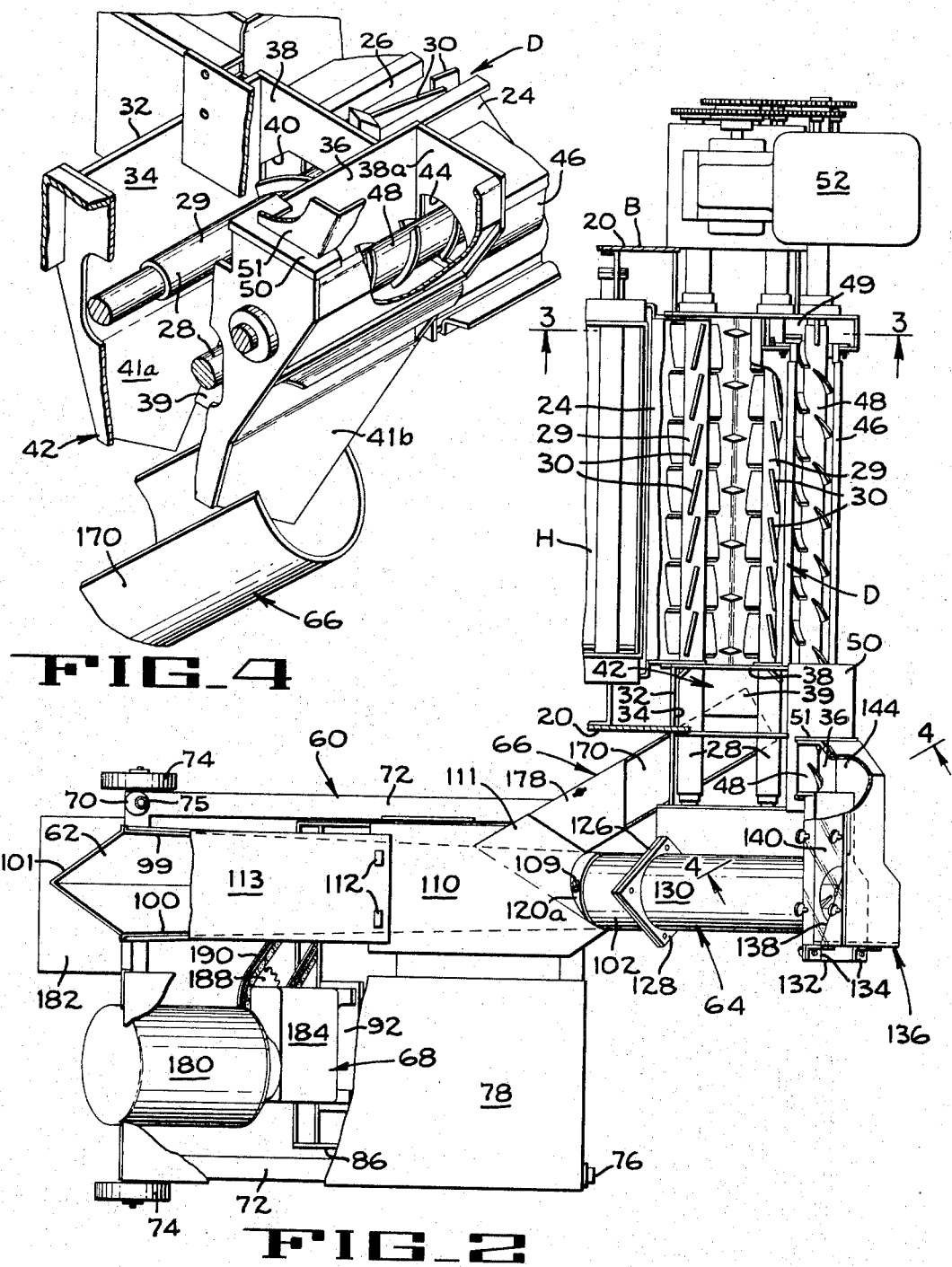

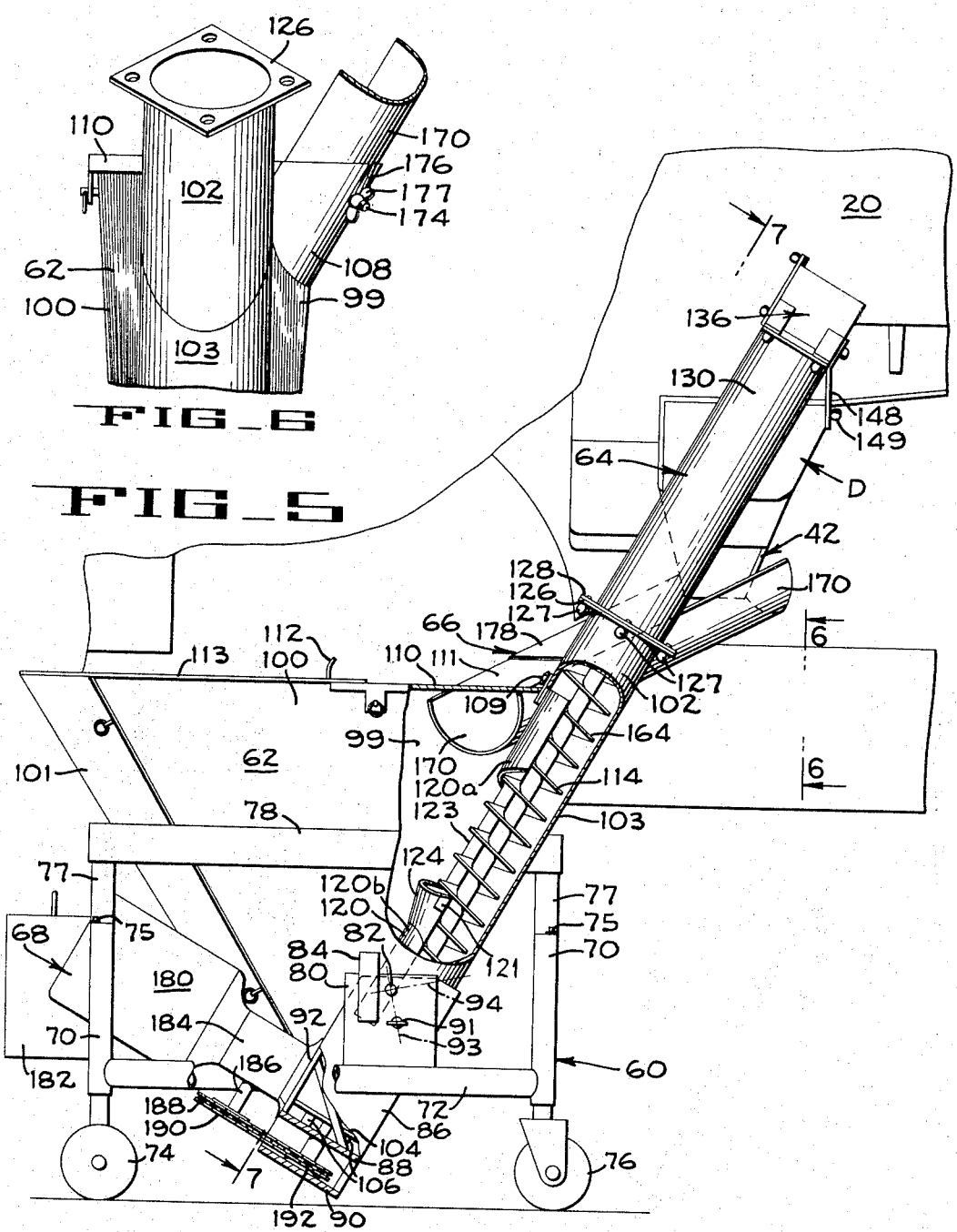

3,351,038
CONFECTION COATING APPARATUS
Phillip A. Miller, Tujunga, and Robert J. Betschart, Sacramento, Calif., assignors to FMC Corporation, San Jose, Calif., a corporation of Delaware
Filed Aug. 24, 1965, Ser. No. 482,230
13 Claims. (Cl. 118—24)

This invention pertains to apparatus for applying a coating of comminuted material to various products, and more particularly it pertains to apparatus for returning excess amounts of coating material to a coating machine and, in so doing, controlling the thickness of the coating layer on the products.

Heretofore, in automatic coating machines the coating machine was supplied with an excess amount of coating material to insure complete coverage of all of the products being coated. The excess material which was not consumed by the machine, i.e. applied on the products, was then discharged into a storage bin. When more coating material was needed for the machine, the non-consumed coating material which had been collected in the storage bin was gathered along with fresh coating material by hand labor and poured into the inlet of the coating machine. The fresh coating material was added to the non-consumed material to compensate for the coating material adhering to the products coated. The recirculation of this non-consumed coating material and the addition of fresh coating material was a costly operation requiring hand labor and constant surveillance of the amount of coating material both in the inlet of the machine and in the storage bin.

It is an object, therefore, of this invention to provide an automatic return system for partially replenishing the supply at the inlet of the coating machine with previously circulated coating material.

Another object of the invention is to provide apparatus for recirculating the non-consumed coating material to the coating machine while simultaneously adding fresh coating material to replace the supply of coating material adhering to the coated products in the coating machine.

In carrying out the aforementioned objects of the invention, it was found that another unexpected and improved result occurred. By controlling the speed of the conveyor in the return apparatus, the amount of coating material within the coating machine could be also controlled. As a result the thickness of the layer of coating material on the products being coated could be regulated solely by controlling the quantity of coating material fed into the coating machine.

It is another object, therefore, of the invention to provide apparatus for controlling the thickness of the coating material on the products in the coating machine.

Another object of the invention is to provide apparatus for regulating the quantity of coating material fed into the coating machine.

In principle, the coating machine consumes a certain amount of coating material due to the fact that the material is hurled upwardly in a coating chamber by an impeller or the like and a certain amount of it adheres to the products being coated. An excessive amount of coating material is always available in the coating chamber to assure uniform coverage, with the excess coating material being discharged into a storage bin. The thickness of the layer of coating material on the product is dependent upon the quantity of coating material in the coating chamber of the machine and, as a result, when the quantity increases, the thickness of the layer on the products likewise increases. This condition continues until such time as saturation occurs and additional increases in the quantity of the coating material will not produce an additionally thick coating on the product.

The invention will be best understood by referring to the following detailed description and the accompanying drawings, in which:

FIGURE 1 is a side elevation of the coating material return or recirculating apparatus, constructed in accordance with the principles of this invention, shown connected to a confection coating machine installed in a confection forming line.

FIGURE 2 is an enlarged diagrammatic plan of the coating material return apparatus again shown in its relation to the coating machine.

FIGURE 3 is an enlarged vertical section of the coating machine taken substantially along the lines 3—3 of FIGURE 2.

FIGURE 4 is an enlarged fragmentary perspective taken looking in the direction of arrows 4—4 of FIGURE 2.

FIGURE 5 is an enlarged side elevation of the coating material return apparatus.

FIGURE 6 is an enlarged fragmentary elevation of a portion of the coating material return apparatus as viewed generally in the direction of the arrows 6—6 shown in FIGURE 5.

FIGURE 7 is an enlarged fragmentary section taken substantially along the lines 7—7 shown in FIGURE 5, with parts broken away for clarity.

FIGURE 8 is an enlarged section of the recirculating apparatus taken substantially along the lines 8—8 of FIGURE 7.

FIGURE 9 is an enlarged fragmentary section of a portion of the conveyor taken along the lines 9—9 of FIGURE 7.

In the embodiment of the invention illustrated in FIGURES 1 and 2, the reference letter A indicates a supporting structure having mounted thereon a rigid frame B. The frame B includes two laterally spaced longitudinally extending side members 20 having an endless circulating conveyor 22 mounted between upper portions of the side members. A portion of a confection forming apparatus C, which advances frozen confections in molds in the direction of arrow T with sticks S projecting upwardly, is shown in its cooperative environment with the frame B. The conveyor 22 is provided with grippers that are arranged to be lowered to grip the upwardly projecting sticks S at a defrosting station E, remove the confections from the molds, and transport the confections in the direction of the arrow R to a coating machine D. The confection forming apparatus C advances the confections in longitudinally spaced rows with each row having a desired number of confections. As mentioned above, the rows of confections are serially transferred, an entire row at a time, from the apparatus C to the conveyor 22 which carries them to an oiling station H, and thence to the coating machine D. The coating machine D is secured to the side frame members 20 to extend transversely relative to the direction of movement of the conveyor 22, and the conveyor 22 is arranged to serially lower each row of confections into the coating zone of the coating machine so that granular coating material may be deposited thereon. The particular manner of such coating will hereinafter be more particularly described.

Referring now to FIGURES 2 and 3, the coating machine D of this invention includes an elongated casing 24 which is generally heart-shaped in cross-section (FIG. 3) with the apex thereof being truncated to form a generally rectangular opening 26 which extends longitudinally of the casing. A set of elongated impellers 28 are rotatably mounted in the coating chamber defined by the casing 24, and each impeller includes a series of radially extending blades 30 that are secured to a shaft 29 at points spaced longitudinally of the shaft. As shown in FIGURE 2, each blade is secured to the outer periphery of the shaft at a slight angle relative to the longitudinal axis of the shaft so as to form a slight helix. The blades not only serve to engage and propel the granular coating material upward toward the opening 26 to coat the confections inserted through the opening but also to effect a general migration or conveying movement of the coating material longitudinally relative to the casing.

A housing 32 (FIGS. 2 and 4) is secured to one end of the casing 24 and includes a discharge compartment 34 and a supply compartment 36. The housing is provided with an end wall 38 separating the compartment 34 from the interior of the casing 24. The end wall has an opening 40 communicating with the interior of the casing so that the material conveyed by the blades 30 through the casing, which does not adhere to a confection, passes out of the casing and is received by the discharge compartment 34. The discharge compartment has a forwardly sloping rear wall 39 and inwardly sloping side walls 41a and 41b that extend downwardly to form a discharge hopper 42 (FIG. 4) which receives the non-consumed material and directs it into the recirculating apparatus in a manner to be described presently.

The supply compartment 36 includes an end wall 38A which is an extension of the housing wall 38 and has an opening 44 (FIG. 4) which communicates with a covered U-shaped trough 46. An elongated screw 48 is positioned in the trough to move the material from a point adjacent the opening 44 to a transverse passage 49 (FIG. 2) that leads into the casing 24. The supply compartment 36 also includes a cover plate 50 which has an upwardly extending three-sided chute or hopper 51 that is adapted to receive the coating material from the recirculating apparatus of the present invention in a manner hereinafter to be described.

A motor and gear reduction unit 52 (FIG. 2) is secured to the frame B and supplies the motive power for rotating the respective agitators 28 and the elongated screw 48.

The details of the construction and operation of the foregoing part of the invention are disclosed in an application of French et al., Serial No. 251,283, which is assigned to the instant assignee and is incorporated by reference herein. In this apparatus, comminuted coating material is fed into the supply compartment 36 through the hopper 51 and is carried longitudinally of the coating machine D by the elongated screw 48 to a downstream point where the coating material is moved through passage 49 into the upstream end of the casing 24. The coating material is then hurled upwardly by the impellers against the confections inserted through the opening 26 in the top of the casing to apply a uniform coating on each confection. Excess or non-consumed coating material which does not adhere to the confections is moved longitudinally of the casing due to the inclination of the blades 30, and is finally moved through the opening 40 in the end wall 38 and drops downwardly along the inclined walls of the discharge compartment 34.

An important aspect of this invention is the relationship between the thickness of the coating applied to the confections and the quantity of coating material delivered to the casing 24. It has been found that, with a small amount of excess or non-consumed coating material, a relatively thin coating may be applied to the confections whereas, when the quantity of coating material fed into the coating machine is increased, the thickness of the coating on the confections will also be uniformly increased. Thus by controlling the quantity of coating material fed into the coating machine the thickness of the coating applied on the confections may be varied.

The coating material recirculating apparatus which brings about this result of controlling the thickness of the coating applied to the confections may generally be described by referring to FIGURES 1 and 2 wherein a movable support assembly 60 supports a storage bin 62 which communicates with the feed hopper 51 of the coating machine D through a feed assembly 64 and with the discharge compartment 34 by means of a chute assembly 66. A drive unit 68 is connected with the feed assembly and provides motive power for moving the material in the storage bin upward to the supply hopper 51. As can be readily seen, the coating material recirculating apparatus is a mobile unit which can be quickly moved into place and connected to the coating machine or can be easily moved away from the machine for cleaning and storage.

The movable support assembly 60 is a rigid unit comprising a plurality of upstanding legs 70 interconnected by a rectangular horizontal frame 72. Mounted on the lower ends of the legs 70 are a set of wheels 74 and a set of casters 76. The wheels and casters provide the maneuverability desirable in positioning the apparatus in communication with the coating machine. The legs are telescoping members which are extendable by means of jackscrews 75 which serve to regulate the height of the support assembly. Mounted on the upper end of a pair of relatively high posts 77 and extending over substantially one-half of the movable support assembly is a table 78 (FIG. 2) which is useful in covering the drive unit 68 and providing a support surface for apparatus used in the filling or cleaning of the storage bin 62.

Secured to each side of the horizontal frame 72 is a mounting plate 80 (FIG. 7) which is drilled to receive a pivot bolt 82. Pivotally mounted on each of the bolts 82 is a flat side plate 86 which has a tapped hole near one end to receive the respective bolt. An L-shaped arm 84 is fastened on the right hand mounting plate 80, as viewed in FIGURE 7, and limits the pivotal movement on the mounting plates. Mounted between the flat side plates a short distance from the pivot ends thereof is a top bearing plate 88. Secured between the distal ends of the flat side plates and in parallel relation to the top bearing plate 88 is a bottom bearing plate 90. Welded to the top bearing plate is a motor support plate 92 (FIG. 5) that extends part way between the side plates 86. The flat side plates 86, top and bottom bearing plates 88 and 90, respectively, and the motor support plate 92 provide a rigid unitary pivot housing which, when mounted on the pivot elements 82, may be pivoted between an upright position shown in solid lines in FIGURE 1 to a reclining position shown by the phantom lines in FIGURE 1. The unit may be selectively locked in either position by screws 91 which are threaded through the mounting plates 80 and extend into aligned holes (not shown) provided in the adjacent plates 86 along radial lines 93 and 94.

The storage bin 62 comprises two generally triangularly shaped side walls 99 and 100 (FIG. 5) that are connected by a front wall 101 which, as seen in FIGURE 2, is of V-shaped configuration. From its apex at the upper left hand corner of FIGURE 5, each side wall is inclined inwardly toward the other side wall and, as seen in FIGURES 7 and 8, the side walls are integrally formed with a trough 103 of generally semi-cylindrical cross-section. The lower end of the bin is closed by a transverse wall 104 which has two apertured studs (not shown) projecting outwardly therefrom for reception in tubular apertured sockets 106 formed on the bearing plate 88. A pin (not shown) may be inserted through aligned apertures in each stud and socket to lock the lower end of the storage bin on the pivot frame. The semi-cylindrical trough 103 that is formed in the bin merges at its upper end into a completely cylindrical discharge portion 102. It will be noted in FIGURE 6 that the bin wall 99 has a curved support plate 108 welded in a cut-out portion along the upper edge of the wall closely adjacent the cylindrical discharge portion 102.

Overlying the upper end of the storage bin 62 are a cover plate 113 (FIG. 2) and a cover and transition member 110 which may be fastened thereto by releasable fasteners. The cover and transition member 110 is provided with two upstanding hooks 112 which are received in holes in the cover plate 113, the engagement of the hooks 112 with the plate 113 providing means whereby the plate is pivotally mounted on the bin. The V-shaped container and its respective covers may be made of any suitable material such as sheet metal. As can be readily seen when the cover plate 113 is swung upwardly, coating material can be dumped in the bin for replenishing the supply in the bin.

The feed assembly 64 includes the trough 103 (FIG. 5) formed in the storage bin, a screw 114 which will be described in detail presently, and an elongated conveyor shroud 120 which forms a covering for a major portion of the trough. An upper portion 120a of the shroud is secured to the upper cylindrcilal portion 102 of the bin by a releasable fastener 109. As seen in FIGURES 7 and 8, the shroud has a lower portion 120b that is partially circular in cross-section and is provided with outwardly bent portions 121 that are pressed snugly against the inner surface of the trough 103 such that the shroud and the trough form a generally cylindrical housing for the screw 114. A portion of the shroud between the upper portion 120a and the lower portion 120b is cut away (FIGS. 5 and 7) to form an upper opening 123 leading to the screw, and an outwardly extending baffle 124 is formed on the shroud at the lower edge of the opening 123. The shroud is mounted over the trough so that its lower end is spaced from the end wall 104 to provide a lower inlet opening 125 (FIG. 7) so that the coating material stored in the bin below upper opening 123 can flow into the trough 103.

Coating material that enters the trough 103 through either or both of the openings 123 and 125 is moved upwardly by the screw into a cylindrical conveyor tube 130. A flange 126 is formed on the upper end of the upper cylindrical portion 102 and is secured by thumbscrews 127 to a mating flange 128 formed on the conveyor tube 130.

Formed on the upper end of the conveyor tube 130 is a substantially rectangular flange 132 (FIG. 7). The flange is secured to tabs 134 mounted around a cylindrical opening in a generally rectangular L-shaped discharge tube 136. The flange 132 joins the discharge tube 136 in such a manner as to provide a continuous opening from the conveyor tube into the discharge tube. The discharge tube 136 is provided with an inclined baffle 138, and with a removable transparent cover 140 held tightly against the walls of the discharge tube by wing nuts 142. An outlet chute 144 is formed on the discharge tube and is positioned to extend into the three-sided chute 51 (FIG. 2) formed on the plate 50 overlying the supply compartment 36 of the coating machine D. A bracket 148 (FIG. 5) is secured to the discharge tube as by welding and is mounted on a portion of the coating machine D by an additional wing nut 149. Thus, when assembled, the discharge tube 136 is securely positioned in flow communication with the supply compartment 36 of the coating machine.

The upper end of the conveyor screw 114 is rotatably mounted on a spindle 162 (FIG. 7) which is secured in the discharge tube 136 so that its axis extends centrally of the conveyor tube 130. Formed on the shaft of the conveyor screw 114 is a helical flight or thread 164. The lead of the flight increases from the bottom to the top of the conveyor screw. The lead of the flight is abruptly doubled a short distance above the lower end of the shroud 120 and thereafter is uniformly expanded to a lead of four times the initial lead. Because of this increase in the lead, the quantity of coating material which the screw can receive at the upper opening 123 is doubled as compared to the amount it can receive at the lower opening 125. The baffle 124 has a concave wall that faces the screw and deflects inwardly toward the screw any coating material which may tend to leak outwardly beyond the flights of the screw under conditions in which the level of coating material within the container is below the baffle. In other words, the baffle prevents the coating material from falling out of the screw through the upper opening 123 when this opening is not in use due to low level conditions.

The discharge chute assembly 66 comprises a generally U-shaped return trough 170 that is fitted near its lower end into the curved support plate 108 welded to the upper edge of the side wall 99 of the V-shaped container 62. An alignment stud 174 (FIG. 6) is welded to the underside of the return trough 170 and is slidably received in a slot 176 formed in the support plate 108. A suitable wing nut 177 securely fastens the trough in the support plate. A cover plate 178 (FIG. 7) overlies part of the open upper surface of the trough 170 and is held in position by a wing nut disposed on a stud 179 welded to an inwardly directed flange formed on the trough. The lower end of the cover plate abuts an upwardly inclined portion 111 of the cover and transition member 110. Thus, as best shown in FIGURE 7, the return trough is covered for a substantial portion prior to entering the storage bin. The upper end of the trough is positioned beneath the discharge hopper 42 (FIG. 4) and receives the nonconsumed coating material from the lower end of the hopper. The lower end of the trough 170 may project into the storage bin and end in a position overlying the upper inlet opening 123 in the conveyor shroud 120. Consequently, the coating material received from the coating machine slides down the hopper, through the trough and onto the flights of the conveyor screw 160. Since the lead of the flights at the opening 123 is double the lead of the flights below the conveyor shroud, the coating material may be fed directly into the screw and recirculated with fresh coating material into the coating machine.

The drive 68 for the conveyor screw 114 comprises a motor 180 (FIG. 2) of any suitable type but which preferably operates on a D.C. voltage, such as a one-half horsepower, 1725 r.p.m. 100/90 v. D.C. motor. The speed of the motor is controlled by any suitable means, such as a silicon control rectifier, which is housed in a control panel 182. The motor is provided with a gear reducer 184 which has an outwardly projecting drive shaft 186 (FIG. 5). Keyed to the outer end of the drive shaft is a sprocket 188 around which is entrained a drive chain 190. The chain is also trained around a sprocket 192 which is drivingly connected to the drive end 158 of the conveyor screw 114 in a manner to be hereinafter described. By suitable controls on the panel 182 the speed of the motor and thus the rotational speed of the conveyor screw can be regulated to control the quantity of coating material fed into the coating machine.

The drive end 158 of the conveyor screw 114 is rotatably secured between the top and bottom bearing plates 88 and 90 by an arrangement best shown in FIGURE 9. Part of the drive end 158 is reduced in diameter and is formed with a flat side wall 196. The flat side wall abuts a flat surface formed on a coupling member 198 welded to a bearing sleeve 200 which is threaded at its lowermost end as at 202. The coupling and bearing sleeve are provided with a groove 204 and a slot 206, respectively, in which is positioned a key 208. The key fits in a slot formed in the sprocket 192 to connect the sprocket with the lower end of the conveyor screw. The sprocket is located longitudinally of the sleeve 200 by a spacer 210, a plurality of "O-rings" and a pair of bearing units 214 and 215. The bearings are confined in bearing supports 216 securely fastened to the opposed walls of the top and bottom bearing plates. A bearing retainer 218 circumscribes the lowermost end of the bearing sleeve 200 and is held in position by a nut 220. As assembled in this manner, the drive end of the conveyor screw is suitably rotatably mounted and secured against longitudinal movement.

To prevent loss of the granular coating material through the end plate 104 of the V-shaped container 62 a retainer anchor plate 272 is positioned about the drive end of the conveyor screw 114 and abuts the inner wall of the end plate 104. Circumscribing the drive end and abutting the outer wall of the end plate is a retainer plate 274 securely fastened to the retainer anchor plate by suitable thumb screws 275 which extend through openings in end plate 104. The two plates have confined therebetween a suitable retainer ring 276 which abuts snugly against the drive end of the conveyor screw and prevents loss of coating material out of the container around the screw.

In the over-all operation of the coating material return apparatus the storage bin 62 is filled with fresh coating material and the motor 180 energized to rotate at a desired speeed as controlled by the control panel 182. The material enters the conveyor screw through the lower opening 125 below the lower end of the shroud 120, and at the upper opening 123 and is carried upwardly through the conveyor tube 130 and into the L-shaped discharge tube 136. The material impinges against the baffle 138 in the discharge chute assembly 66 and is fed out of the discharge chute assembly through the outlet chute 144. The slight back pressure on the coating material being conveyod by the screw caused by the baffle 138 causes the coating material to slip relative to the threads or flights of the screw and thus positive flow upwardly through the conveyor tube 130 is assured. The coating material fed into the supply compartment 36 is carried by the elongated conveyor screw 48 and is deposited within the casing 24. The impellers 30 then hurl the material at the confections projecting downwardly through the opening 26.

The thickness of the coating applied to the confections is dependent upon the quantity of excess coating material in the coating chamber. By increasing the speed of the motor, the rate of flow of coating material is increased, increasing the quantity of material fed into the casing 24, and consequently increasing the amount thrown at the confections.

The excess coating material is then moved by the impellers into the discharge compartment 34 where it is directed through the discharge hopper 42 and the return trough 170 into the V-shaped container. When the level of the coating material in the V-shaped container falls below the upper opening 123 the coating material returned from the coating machine is fed directly through the upper opening into the conveyor screw such that the returned coating material is mixed with fresh coating material entering the conveyor screw through the lower opening 125 at the bottom of the V-shaped container. Otherwise, the coating material returned by the trough falls on the fresh coating material in the container.

From the foregoing description, several advantages should be apparent. The over-all system makes available to the coating machine a continuous quantity of fresh and unused excess coating material while requiring only a minimum of surveillance and only occasional refilling.

The thickness of the coating on the confections may be readily controlled merely by adjusting the speed of the motor and hence the quantity of coating material fed into the coating machine. This advantage is extremely important in the commercial utilization of the coating material return apparatus since the desired coating thickness on the confections may often be suspectible to change.

Still other advantages are the arrangement of the discharge chute assembly to provide back pressure on the material in the conveyor screw to cause slippage on the threads of the screw and the provision of a baffle at the second inlet to the conveyor screw to prevent material from being discharged out the upper opening 123 during conditions when the level of the coating material in the V-shaped bin is below the baffle.

While the preferred apparatus for carrying out the invention has been shown and described, it will be understood that it is capable of modification and variation while still operating according to the principles of the invention. It is to be understood, therefore, that the scope of the invention is limited only by the claims appended hereto.

Having thus described the invention, that which is believed to be new and for which the protection by Letters Patent is desired is:

1. A coating material return system for an article coating machine which utilizes only a portion of the material received and discharges the remainder comprising, a bin for holding the coating material, a conveyor for moving the material from the bin into the coating machine, a discharge chute positioned for receiving the non-utilized material from the coating machine and for directing the material back into said conveyor, said conveyor and said discharge chute being positioned in said bin such that excessive discharge from the coating machine will be free to fall into said bin when said conveyor is filled.

2. The return system defined by claim 1 wherein said conveyor includes a rotary screw circumscribed partially by said bin, a shroud overlying said screw and defining upper and lower intake openings whereby fresh coating materail and returned coating material are simultaneously fed into and conveyed by said screw.

3. The return system defined by claim 2 wherein said shroud is provided with a baffle at said upper intake opening through which the returned coating material is fed into said screw whereby fresh coating material being conveyed by said screw is retained within said shroud as it passes said upper intake opening.

4. The return system defined by claim 2 including a movable frame, a set of support plates pivotally mounted on said frame and fastened to said bin, and means for retaining said support plates in a pivotally adjusted position relative to said frame.

5. A coating regulator for an article coating machine comprising, a casing defining a chamber wherein the articles to be coated are placed, means for directing the coating material at the articles to be coated, means for storing the coating material, means for moving the coating material from said storing means to said chamber, means positioned to receive non-consumed coating material from said chamber and to guide the material into said storing means, and adjustably variable speed means for driving said material moving means whereby the amount of coating material fed into said chamber and thus the thickness of the coating on the articles is controlled by the speed of said drive means.

6. The coating regulator defined by claim 5 wherein said material moving means is partially confined in said storing means and said means for guiding the non-consumed coating material is positioned to guide the material into said material moving means.

7. A coating regulator for an article coating machine in which the thickness of the coating applied on the articles is dependent upon the amount of coating material fed into the machine, comprising a casing having a discharge opening and defining a chamber wherein the articles to be coated are positioned, a plurality of impellers rotatably mounted within said chamber for directing granular coating material at the articles and for moving the excess coating material longitudinally of said chamber through said discharge opening means positioned for receiving the excess coating material from said discharge opening, means for continuously supplying said chamber with fresh coating material at a predetermined rate, and means for varying said predetermined rate whereby the quantity of coating material directed at the articles within said chamber and thus the thickness of the coating may likewise be varied.

8. The coating regulator defined by claim 7 wherein said means for continuously supplying said chamber with fresh coating material includes a V-shaped bin having a curved inner portion, a screw conveyor mounted in said bin and partially circumscribed by said inner portion, a shroud substantially covering said screw conveyor and providing first and second inlets to said conveyor and said means for receiving the excess coating material is positioned to empty into one of said inlets whereby the excess coating material is mixed with fresh coating material as it is supplied by said screw conveyor.

9. In combination, means defining a coating chamber having an inlet portion; and means for delivering material to said inlet portion including an upwardly inclined conduit, means defining an upper and a lower inlet opening in said conduit, a screw in said conduit for receiving material moved through said upper and lower openings, and a baffle mounted adjacent the lower edge of said upper opening to intercept and redirect material tending to flow out of said upper opening when only the lower opening is supplying material to said screw.

10. In combination, means defining a coating chamber having a material-receiving inlet portion; and a conveyor system for delivering material to said inlet portion including a trough of generally semi-cylindrical configuration, a screw movable through said trough to convey material, a pair of inclined walls integrally formed with the walls of said trough and extending upwardly therefrom in diverging relation, and means mounting said trough in an inclined position such that material deposited between said walls will be guided inwardly and downmardly to a position over the lower end of said inclined trough.

11. In combination, means defining a coating chamber having an inlet portion; and a conveyor system for delivering material to said inlet portion including an inclined trough, a screw disposed in said trough for advancing material upwardly along said trough, means partially covering said trough and defining a lower and an upper inlet opening, said screw having a variable pitch such that the material handling capacity of said screw adjacent said upper inlet opening is approximately twice as much as its capacity adjacent said lower inlet opening.

12. In combination, means defining a coating chamber having an inlet portion; and a conveying system for delivering material to the inlet portion of said chamber, said system including an inclined trough, a screw in said trough, means for rotating said screw to advance material upwardly in said trough, and an accumulating conduit communicating with the upper end of said trough and extending laterally therefrom, said conduit having means effective to exert a back pressure on the material in said trough whereby the material is pressed outwardly in said trough into frictional engagement with the walls of the trough, said frictional engagement being effective to resist movement of the material with the blades of said screw and to thereby cause movement of the material upwardly in said trough.

13. In combination, a coating machine; a suppport frame adjacent said machine; and a storage and conveyor unit including a storage bin, a material delivery conduit extending upwardly from said bin, a conveyor element in said conduit for advancing material therethrough, and means pivotally mounting said unit from an upright position wherein said conduit is in operative connection to said coating machine and said bin opens upwardly and a reclined position wherein said conduit extends generally horizontally and said bin opens horizontally, and means for driving said conveyor element when it is in either of said positions.

References Cited
UNITED STATES PATENTS

| | | | |
|---|---|---|---|
| 804,022 | 11/1905 | May | 198—56 X |
| 1,423,698 | 7/1922 | Thurston | 198—54 X |
| 2,119,910 | 6/1938 | Ferry | 118—24 X |
| 2,789,738 | 4/1957 | Hall et al. | 198—213 X |
| 2,845,193 | 7/1958 | Schubert et al. | 198—213 X |
| 3,045,640 | 7/1962 | Hill et al. | 118—24 X |
| 3,252,165 | 5/1966 | French et al. | 118—24 |
| 3,280,791 | 10/1966 | Lampman | 118—24 |

CHARLES A. WILLMUTH, *Primary Examiner.*

R. I. SMITH, *Assistant Examiner.*